(No Model.)
D. H. GABRIEL.
NUT LOCK.
No. 586,024.  Patented July 6, 1897.
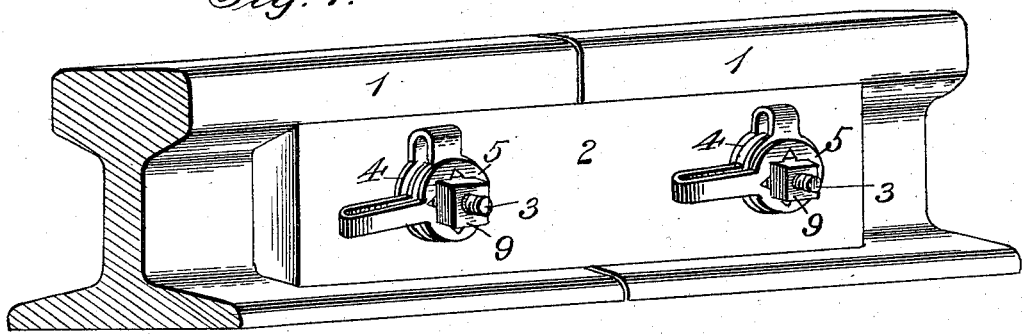
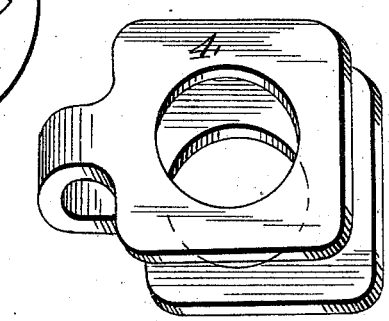
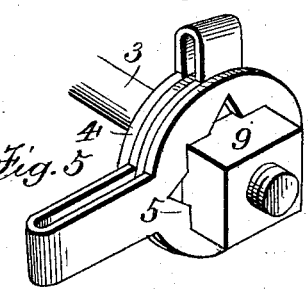 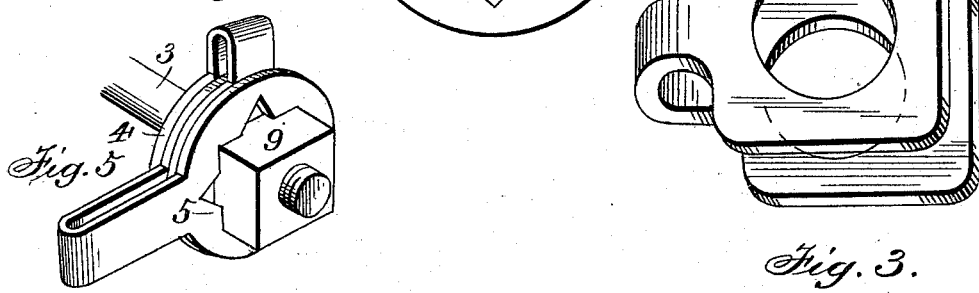
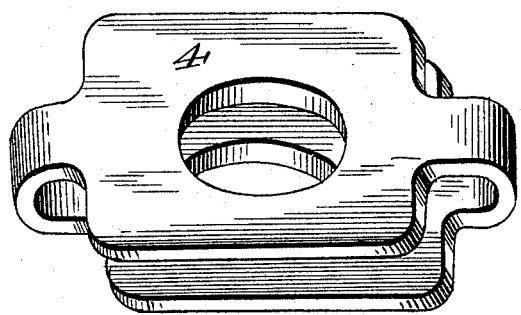
Witnesses
Inventor:
Darneville H. Gabriel
Attorneys

UNITED STATES PATENT OFFICE.

DARNEVILLE HYACINTHE GABRIEL, OF CYPRE MORT, LOUISIANA.

NUT-LOCK.

SPECIFICATION forming part of Letters Patent No. 586,024, dated July 6, 1897.

Application filed November 21, 1896. Serial No. 612,967. (No model.)

*To all whom it may concern:*

Be it known that I, DARNEVILLE HYACINTHE GABRIEL, a citizen of the United States, and a resident of Cypre Mort, in the parish of St. Mary and State of Louisiana, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to an improved washer and nut-lock for use on railroads for preventing backward movement or turning of the nuts on the bolts which connect the rails together.

The object of the invention is to provide an improved construction of the same which shall be simple and economical and efficient in use.

The invention consists in the novel construction and combination of parts hereinafter fully described and claimed.

In the accompanying drawings, Figure 1 is a perspective view of my improved washer and nut-lock, showing the same in use. Fig. 2 is an elevation of the nut-lock detached. Fig. 3 is a perspective view of the washer detached. Fig. 4 is a similar view of a modified construction. Fig. 5 is a perspective view of the nut-lock, washer, bolt, and nut with the fish-plate and rails removed.

In the said drawings the reference-numeral 1 designates two railroad-rails, 2 the fish-plate, and 3 the bolts for connecting the rails and fish-plate.

The numeral 4, Fig. 3, designates a washer consisting of two metal plates connected together at one end and formed with alined openings for the passage of the bolt. In Fig. 4 these plates are connected together at opposite ends. The washers are made of spring-steel.

The numeral 5 designates the nut-lock, comprising two spring-steel arms connected together at one end. The free end of one of these arms is formed with a plate 6, having a circular hole 7 therein, while the other arm is formed with a plate 8, having an angular opening so as to engage with and hold the nut 9.

In using the device the plate 6 of the nut-lock is passed between the plates of the washer and the latter then slipped on the bolt. The nut is then applied and screwed home, the plate 8 being pulled outward so that the nut will not engage therewith while being turned. When the nut is screwed home, the plate 8 is let go, when it will spring inward and the angular opening will engage with the nut and prevent the latter from turning. If the said opening does not exactly coincide with the nut, so as to engage therewith, the nut should be turned backward slightly for such purpose.

Having thus described my invention, what I claim is—

The combination with the spring-washer comprising the two connected plates with registering bolt-holes therein, of the nut-lock consisting of the connected spring-arms one of which is provided with an apertured plate located between the plates of the washer and the other formed with a plate having an angular opening, substantially as described.

In testimony that I claim the foregoing as my own I have hereunto affixed my signature in presence of two witnesses.

DARNEVILLE HYACINTHE GABRIEL.

Witnesses:
LOUIS DESÓRÉ VENET,
FRANK CARMDUCHE.